US009463760B2

(12) United States Patent
Choi et al.

(10) Patent No.: US 9,463,760 B2
(45) Date of Patent: Oct. 11, 2016

(54) METHOD AND SYSTEM FOR PROTECTING OCCUPANTS IN VEHICLE

(71) Applicant: Hyundai Motor Company, Seoul (KR)

(72) Inventors: Jae Ho Choi, Seoul (KR); Hyock In Kwon, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/715,194

(22) Filed: May 18, 2015

(65) Prior Publication Data

US 2016/0129868 A1 May 12, 2016

(30) Foreign Application Priority Data

Nov. 12, 2014 (KR) .................. 10-2014-0156931

(51) Int. Cl.
| | | |
|---|---|---|
| *B60R 21/13* | (2006.01) | |
| *B60R 21/013* | (2006.01) | |
| *B60R 21/0134* | (2006.01) | |
| *B60R 21/0136* | (2006.01) | |
| *B60R 21/015* | (2006.01) | |
| *B60R 21/01* | (2006.01) | |

(52) U.S. Cl.
CPC ......... *B60R 21/013* (2013.01); *B60R 21/0134* (2013.01); *B60R 21/0136* (2013.01); *B60R 21/01552* (2014.10); *B60R 21/01554* (2014.10); *B60R 2021/01013* (2013.01); *B60R 2021/01231* (2013.01); *B60R 2021/01286* (2013.01); *B60R 2021/01315* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 5,222,761 | A | * | 6/1993 | Kaji ...................... | B60R 21/017 280/730.2 |
| 5,492,361 | A | * | 2/1996 | Kim ...................... | B60N 2/468 280/728.1 |
| 6,848,710 | B2 | * | 2/2005 | Yasuhara ............. | B60R 21/0136 280/730.2 |
| 7,108,280 | B2 | * | 9/2006 | Abe ...................... | B60R 21/045 180/282 |
| 7,278,682 | B2 | * | 10/2007 | Friedman .............. | B60N 2/0276 297/216.1 |
| 7,401,807 | B2 | * | 7/2008 | Breed .................... | B60N 2/002 180/268 |
| 7,673,937 | B2 | * | 3/2010 | Core Almarza ...... | B60R 21/207 280/730.2 |

(Continued)

FOREIGN PATENT DOCUMENTS

| | | | | |
|---|---|---|---|---|
| FR | 2957863 | A1 * | 9/2011 | ........... B60N 2/4495 |
| JP | 11-170961 | A | 6/1999 | |

(Continued)

OTHER PUBLICATIONS

Korean Office Action issued in Korean Application No. 10-2014-0156931 dated Feb. 5, 2016.

(Continued)

*Primary Examiner* — Nicole Verley
(74) *Attorney, Agent, or Firm* — McDermott Will & Emery LLP

(57) ABSTRACT

A system for protecting one or more occupants in a vehicle includes a seat posture sensor configured to detect seat posture data, a collision detector configured to detect collision data of the vehicle, and a controller. The controller is configured to receive the collision data from the collision detector, determine a collision generation direction, and selectively deploy one or more airbags provided around the one or more occupants according to the collision generation direction and the seat posture data detected by the seat posture sensor.

16 Claims, 8 Drawing Sheets

(56) References Cited

U.S. PATENT DOCUMENTS

| | | | | |
|---|---|---|---|---|
| 7,866,696 | B2* | 1/2011 | Wang | B60N 2/0276 |
| | | | | 280/748 |
| 7,896,387 | B2* | 3/2011 | Ideue | B60R 21/23138 |
| | | | | 280/729 |
| 7,909,359 | B2* | 3/2011 | Inoue | B60R 21/0134 |
| | | | | 280/730.2 |
| 7,925,403 | B2* | 4/2011 | Kumagai | B60R 21/0134 |
| | | | | 180/271 |
| 7,971,901 | B2* | 7/2011 | Tomitaka | B60R 21/207 |
| | | | | 280/730.2 |
| 7,983,817 | B2* | 7/2011 | Breed | B60N 2/002 |
| | | | | 250/578.1 |
| 8,060,280 | B2* | 11/2011 | Hadi | B60R 21/0134 |
| | | | | 701/45 |
| 8,169,311 | B1* | 5/2012 | Breed | B60C 11/24 |
| | | | | 340/438 |
| 8,235,416 | B2* | 8/2012 | Breed | B60J 10/00 |
| | | | | 180/273 |
| 8,393,667 | B2* | 3/2013 | Hashimoto | B60N 2/0276 |
| | | | | 296/65.16 |
| 8,403,358 | B2* | 3/2013 | Choi | B60R 21/214 |
| | | | | 280/728.2 |
| 8,604,932 | B2* | 12/2013 | Breed | B60J 10/00 |
| | | | | 180/271 |
| 8,630,772 | B2* | 1/2014 | Ieda | B60R 21/0134 |
| | | | | 280/735 |
| 9,108,584 | B2* | 8/2015 | Rao | B60R 21/017 |
| 9,211,860 | B2* | 12/2015 | Muraji | B60R 21/23138 |
| 2006/0091653 | A1* | 5/2006 | De Mersseman | B60R 21/013 |
| | | | | 280/735 |
| 2010/0324774 | A1* | 12/2010 | Bouni | B60R 21/0152 |
| | | | | 701/31.4 |
| 2014/0361521 | A1* | 12/2014 | Fukawatase | B60R 21/231 |
| | | | | 280/730.1 |
| 2015/0091282 | A1* | 4/2015 | Nagasawa | B60N 2/4228 |
| | | | | 280/730.1 |
| 2015/0274111 | A1* | 10/2015 | Ishida | B60R 21/207 |
| | | | | 280/730.2 |

FOREIGN PATENT DOCUMENTS

| | | |
|---|---|---|
| JP | 2003-509284 A | 3/2003 |
| JP | WO 2008050656 A1 * 5/2008 | ....... B60R 21/01538 |
| JP | 2008-279977 A | 11/2008 |
| JP | 2013-216209 A | 10/2013 |
| KR | 10-0174019 B1 | 11/1998 |
| KR | 1999-017534 A | 3/1999 |
| KR | 2005-0114306 A | 12/2005 |
| KR | 10-2012-0038655 A | 4/2012 |
| WO | 01-21448 A1 | 3/2001 |

OTHER PUBLICATIONS

Korean Notice of Allowance issued in Korean Application No. 10-2014-0156931, dated Jul. 15, 2016.

* cited by examiner

METHOD AND SYSTEM FOR PROTECTING OCCUPANTS IN VEHICLE

CROSS-REFERENCE(S) TO RELATED APPLICATIONS

The present application claims priority to Korean Patent Application No. 10-2014-0156931, filed Nov. 12, 2014, the entire contents of which is incorporated herein for all purposes by this reference.

TECHNICAL FIELD

Exemplary embodiments of the present invention relate to a technique for protecting occupants in a vehicle; and, particularly, to a method and system for protecting occupants in a vehicle, which determine a boarding posture of an occupant and optimize an operation of a device for protecting the occupant according to the boarding posture in the event of a collision or when the collision is predicted.

BACKGROUND

An airbag serves to relieve an impact on an occupant by suitable expansion of an airbag cushion in the event of a vehicle accident so as to reduce or prevent injuries to the occupant. A plurality of airbags may be installed around occupants so as to be expanded and deployed in various forms.

That is, a vehicle may be provided with a basic front airbag which is deployed in front of a driver seat and a passenger seat, a curtain airbag and a side airbag which are deployed at lateral sides of occupants to protect the occupant, a knee airbag for protecting knees of the occupants, and the like.

Expansion behaviors of the airbags are very important to secure safety of the occupants, and thus the occupants are safely protected due to suitable expansion and deployment of the airbags according to collision directions.

A conventional airbag device is designed to deploy an airbag cushion on the basis of a state in which a seat back is fixed at a suitable angle to drive a vehicle. For this reason, it is difficult to safely protect occupants by a deployment manner of the conventional airbag cushion in a state in which the seat back is excessively tilted rearward or a seat is fully moved forward or rearward.

For example, if an autonomous vehicle is commercialized for the future and thus the vehicle automatically travels without a need to directly drive the vehicle by a driver, an inner space of the vehicle is changed from a space for driving to a space for relaxation. For this reason, since the vehicle travels in a state in which the seat back of the driver seat is tilted rearward as shown in FIG. 1, boarding postures of the occupants may be freely changed.

That is, when a collision accident occurs in the state in which the boarding postures of the occupants are freely changed, the occupants may not be safely protected through the existing airbag deployment manner. Therefore, an occupant protection system optimized for the changed boarding postures is required.

The matters described as the related art have been provided only for assisting the understanding for the background of the present invention and should not be considered as corresponding to the related art already known to those skilled in the art.

SUMMARY

An embodiment of the present invention is directed to a method and system for protecting occupants in a vehicle, which determine a posture of an occupant and optimize an operation of a safety device for protecting the occupant according to the posture in the event of a collision or when the collision is predicted in order to safely protect the occupant.

Other objects and advantages of embodiments of the present invention can be understood by the following description, and become apparent with reference to the embodiments of the present invention. Also, it is apparent to those skilled in the art that the objects and advantages of the present invention can be realized by the means as claimed and combinations thereof.

In accordance with an embodiment of the present invention, a system for protecting one or more occupants in a vehicle includes a seat posture sensor configured to detect seat posture data, a collision detector configured to detect collision data of the vehicle, and a controller configured to receive the collision data from the collision detector, determine a collision generation direction, and selectively deploy one or more airbags provided around the one or more occupants according to the collision generation direction and the seat posture data detected by the seat posture sensor. In certain embodiments, the seat posture data may include an angle of a seat back or data regarding front and rear positions of a seat. In certain embodiments, the collision data may include a collision signal or a collision prediction signal.

In certain embodiments, the controller may be further configured to, upon determining that a side collision occurs, deploy a side airbag provided at a side door when the seat back angle is equal to or more than a reference angle and deploy the side airbag and a curtain airbag provided at the side door when the seat back angle is less than the reference angle.

In certain embodiments, the controller may be further configured to deploy, upon determining that the side collision occurs, at least one of the side airbag and the curtain airbag at a collision generation side.

The system may further include an occupant detection configured to detect whether or not two or more seats are occupied. The controller may be configured to selectively deploy, upon determining that a side collision of the vehicle occurs, a side center airbag according to the seat posture data and whether or not two or more seats are occupied.

When the controller determines that the side collision of the vehicle occurs, the controller may deploy the side center airbag when two or more seats are occupied.

When the controller determines that the side collision of the vehicle occurs, the controller may deploy the side center airbag when two or more seats are occupied and a difference between angles of two seat backs of the two or more occupied seats is within a reference angle range.

When the controller determines that the side collision of the vehicle occurs, the controller may deploy a front seat side center airbag when two front seats are occupied and positions of both front seats are in the same direction from a center point of a seat rail.

When the controller determines that the side collision of the vehicle occurs, the controller may deploy a rear seat side center airbag when at least one rear seat is occupied.

In certain embodiments, when the controller determines that a head-on collision of the vehicle occurs, the controller may deploy a knee airbag and not deploy a front airbag when the seat back angle is equal to or more than a reference angle. In certain embodiments, the controller may deploy a knee airbag and a front airbag when the seat back angle is less than a reference angle.

When the controller determines that the head-on collision of the vehicle occurs, the controller may operate a seat belt pretensioner when the seat back angle is less than the reference angle.

When the controller determines that a head-on collision of the vehicle occurs, the controller may deploy a front center airbag when two front seats are in a forward position based on a center point of a seat rail.

In certain embodiments, the system may further include an operation detection sensor configured to detect whether or not a lower body support mechanism for supporting a lower body of one of the occupants is operated. When the controller determines that a head-on collision of the vehicle occurs, the controller may deploy a knee airbag when the lower body support mechanism is not operated.

In certain embodiments, when the controller determines that the head-on collision of the vehicle occurs, the controller may operate a seat belt pretensioner regardless of whether the lower body support mechanism is operated.

In certain embodiments, when the collision prediction signal of the vehicle is received by the controller, the controller may control the seat back to be at a set safety angle when the seat back angle is equal to or more than a reference angle.

In certain embodiments, when the collision prediction signal of the vehicle is input to the controller, the controller may deploy a front airbag and a knee airbag and operate a seat belt pretensioner when the seat back angle is less than the reference angle.

In certain embodiments, the lower body support mechanism may be a foot rest.

In accordance with another embodiment of the present invention, a method for protecting one or more occupants in a vehicle includes receiving seat posture data which includes data for an angle of a seat back or data regarding front and rear positions of a seat. of the method also may include receiving a collision signal or collision prediction signal of a vehicle, determining a collision generation direction when the collision signal or the collision prediction signal of the vehicle is received, and selectively deploying one or more airbags provided around the one or more occupants according to the collision generation direction and the seat posture data.

DETAILED DESCRIPTION

Figure 1:
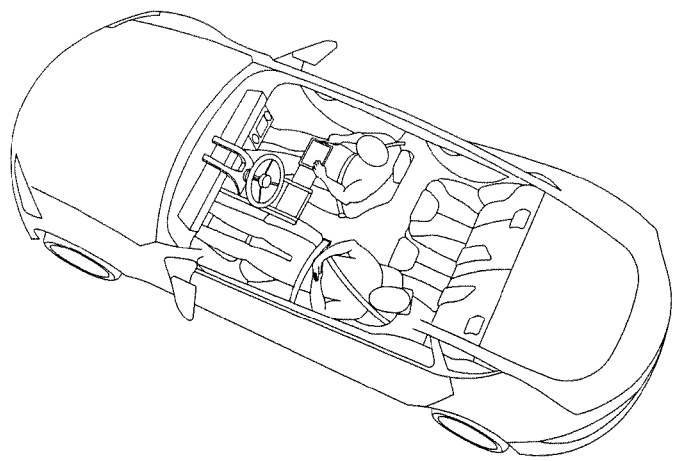
FIG. 1 is a view for explaining a state in which a boarding posture of an occupant is changed within an autonomous vehicle.

Exemplary embodiments of the present invention will be described below in more detail with reference to the accompanying drawings. The present invention may, however, be embodied in different forms and should not be construed as limited to the embodiments set forth herein. Throughout the disclosure, like reference numerals refer to like parts throughout the various figures and embodiments of the present invention.

A system for protecting one or more occupants in a vehicle according to an embodiment of the present invention largely includes a seat posture sensor, a collision detector, and a controller 13.

Figure 2:
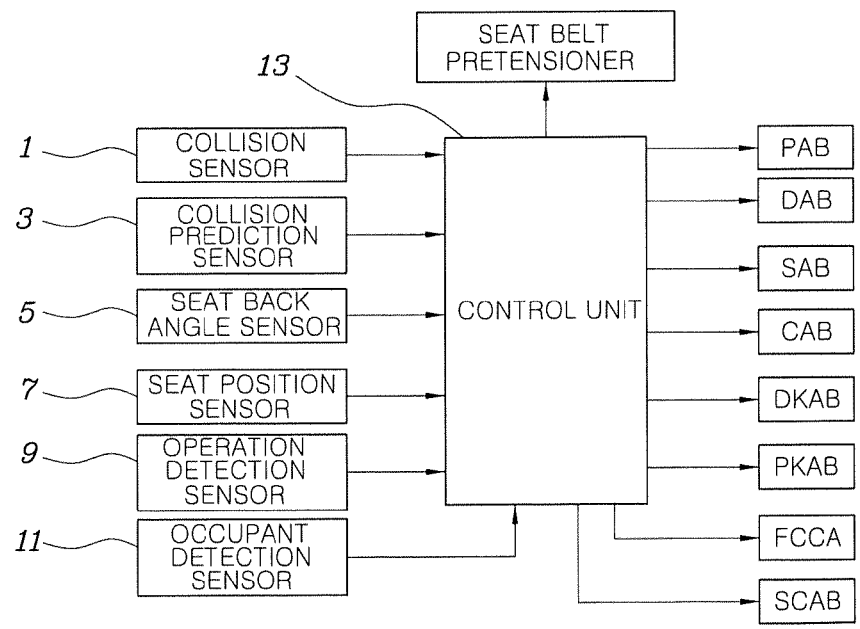
FIG. 2 is a diagram illustrating an entire configuration of a system for protecting occupants in a vehicle according to an embodiment of the present invention.

Embodiments of the present invention will be described in detail with reference to FIG. 2. First, the seat posture sensor serves to detect an angle of a seat back and/or front and rear positions of a seat.

For example, in certain embodiments, the seat posture sensor may include a seat back angle sensor 5 for detecting the angle of the seat back and a seat position sensor 7 for detecting the front and rear positions of the seat.

Here, the seat position sensor 7 detects a position of the seat sliding forward and rearward along a seat rail. The seat position sensor 7 may detect that the seat is located at a front or rear position around a center point of the seat rail.

The collision detector detects and receives a collision signal or a collision prediction signal of a vehicle. For example, the collision detector may include a collision sensor 1 and a collision prediction sensor 3.

That is, the collision sensor 1 may be installed to the front of the vehicle so as to detect a head-on collision signal of the vehicle. One or more collision prediction sensors 3 may be installed on the side of the vehicle so as to detect a side collision signal of the vehicle.

The controller 13 determines a collision generation direction when the collision signal of the vehicle is input, and performs control so as to selectively deploy airbags provided around occupants according to the collision generation direction and a seat posture input from the seat posture sensor.

The controller 13 may be an integrated controller for controlling an operation of the seat to be described later while controlling deployment of the airbag. In certain embodiments, an airbag controller (ACU) for controlling the deployment of the airbag and an electronic controller (ECU) of a seat for controlling the operation of the seat may also be individually provided.

That is, when the signals input from the seat posture sensor and the collision detector are input to the controller 13, the controller 13 determines the collision direction of the vehicle and the seat posture, selects an airbag cushion capable of safely protecting the occupant from impacts among various airbag cushions, based on the conditions, and expands and deploys the selected airbag cushion.

Accordingly, even when a collision accident occurs in a state in which the seat back is tilted rearward as in an autonomous vehicle or the seat is located so as not to be suitable for a driving posture, a portion of various airbags is selectively deployed so as to be optimized for the above seat posture conditions. Consequently, the occupant boarding the vehicle may be safely protected from impacts of the collision accident.

Figure 3:
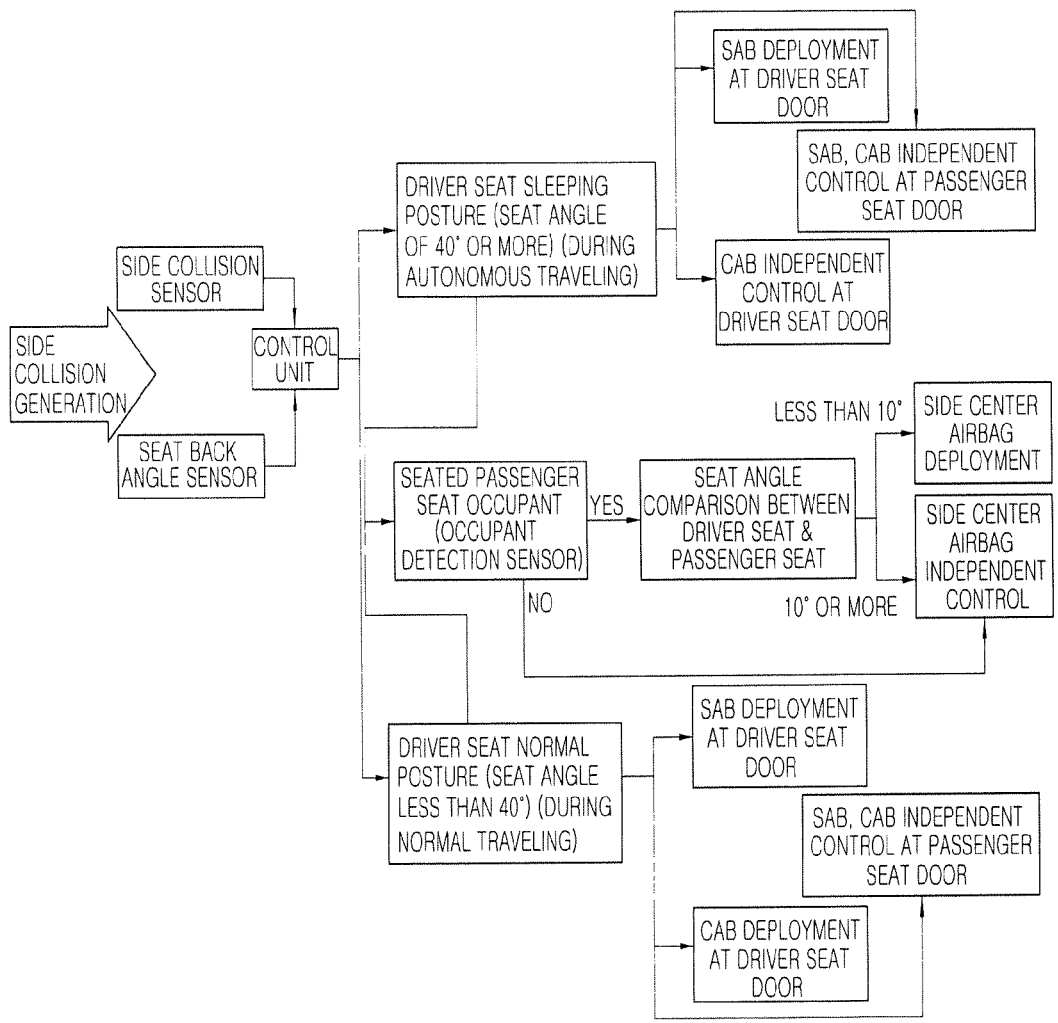
FIG. 3 is a diagram for explaining an occupant protection control flow according to a seat back angle in the event of a side collision under the system for protecting occupants in a vehicle according to the embodiment of the present invention.

FIG. 3 is a diagram for explaining an occupant protection control flow according to a seat back angle in the event of a side collision under the system for protecting occupants in a vehicle according to the embodiment of the present invention. The controller 13 performs control such that a side airbag SAB and/or a curtain airbag CAB, and a side center airbag SCAB are selected and deployed according to the seat back angle.

Specifically, when the controller 13 determines that the side collision of the vehicle occurs, the controller 13 may perform control so as to deploy the side airbag SAB provided at a side door when the seat back angle is equal to or more than a reference angle.

On the other hand, the controller 13 may perform control so as to together deploy the side airbag SAB and the curtain airbag CAB provided at the side door when the seat back angle is less than the reference angle.

Here, the reference angle may be an angle of the seat back at which the occupant seated on the seat is determined to be tilted rearward, and may be set through an experiment.

The seat may be one of a driver seat and a passenger seat which are provided in the front, and a rear seat.

For example, in the event of the side collision at the driver seat, the side airbag SAB at a driver seat door is deployed when a seat angle of the driver seat is equal to or more than the reference angle, and the side airbag SAB and the curtain airbag CAB at the driver seat door are deployed together when the seat angle of the driver seat is less than the reference angle.

In this case, since the curtain airbag CAB at the driver seat door may be controlled so as to be independently deployed when the seat angle of the driver seat is equal to or more than the reference angle, the curtain airbag CAB at the driver seat door may be deployed by other collision signals and impact conditions.

Such deployment action may be identically applied in the event of the side collision at the passenger seat and the rear seat.

That is, the side airbag SAB and the curtain airbag CAB at a passenger seat door may be selectively deployed according to a seat angle of the passenger seat in the event of the side collision at the passenger seat.

In addition, when the controller 13 determines that the side collision of the vehicle occurs, the controller 13 may perform control so as to deploy the side airbag SAB and the curtain airbag CAB at a collision generation side.

That is, when the side collision of the vehicle occurs, preferably, only the side airbag SAB and the curtain airbag CAB at the collision generation side are selectively deployed. Thus, the controller 13 may perform control so as to more actively protect occupants focusing the passenger exposed to impacts.

However, since the side airbag SAB and the curtain airbag CAB at a side opposite to the collision generation side may be controlled so as to be independently deployed when the airbag deployment is performed, the side airbag SAB and the curtain airbag CAB may be deployed by other collision signals and impact conditions.

In addition, embodiments of the present invention may further include an occupant detection sensor 11 for detecting whether or not occupants are seated on both seats.

When the controller 13 determines that the side collision of the vehicle occurs, the controller 13 may perform control so as to selectively deploy the side center airbags SCAB according to a seat posture through the seat posture sensor, together with determination whether or not the occupants are seated on all seats through the occupant detection sensor 11.

Figure 9:
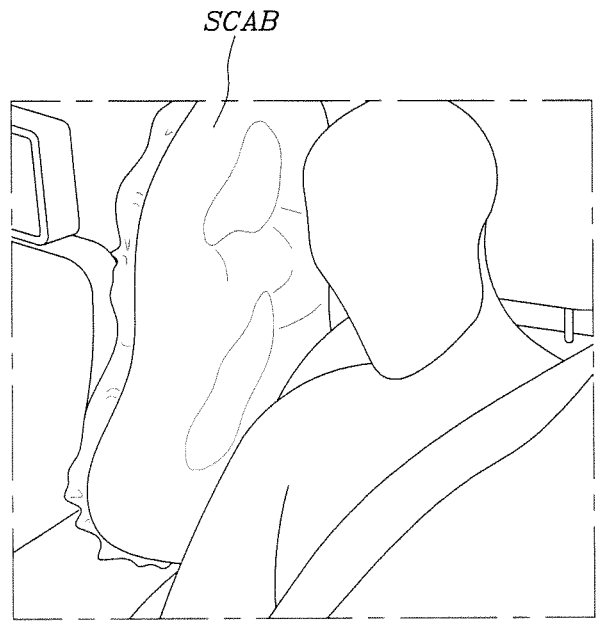
FIG. 9 is a view illustrating a front seat side center airbag used in the system for protecting occupants in a vehicle according to the embodiment of the present invention.
Figure 10:
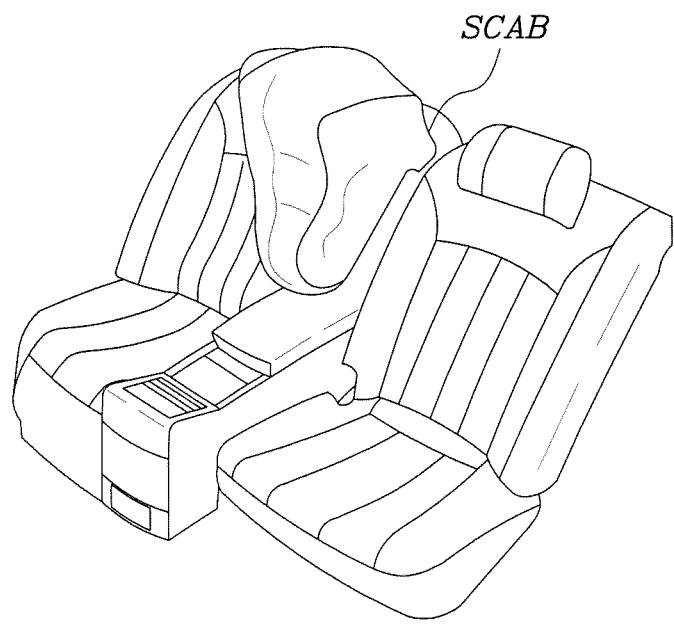
FIG. 10 is a view illustrating a rear seat side center airbag used in the system for protecting occupants in a vehicle according to the embodiment of the present invention.

Here, the side center airbags SCAB may be a front seat side center airbag shown in FIG. 9 and a rear seat side center airbag shown in FIG. 10.

For example, referring to FIG. 3, when the controller 13 determines that the side collision of the vehicle occurs, the controller 13 may perform control so as to deploy the side center airbag SCAB when occupants are seated on both seats.

Furthermore, when the controller 13 determines that the side collision of the vehicle occurs, the controller 13 may perform control so as to deploy the side center airbag SCAB when occupants are seated on both seats and a difference between angles of both seat backs is within a reference angle range. Here, the reference angle range may be set as an angle range in which a significant difference between angles of both seat backs is not present.

That is, in certain embodiments, when the side collision of the vehicle occurs in a state in which occupants are seated on the driver seat and the passenger seat and a significant difference between angles of the seat backs is not present, the front seat side center airbag is deployed so as to prevent a risk of secondary injuries which may be caused by a collision between the occupants seated on the driver seat and the passenger seat due to impact force by the side collision.

Similarly to the above case, in certain embodiments the rear seat side center airbag is deployed when the side collision occurs in a state in which occupants are seated on both rear seats.

However, since the side center airbag SCAB may be controlled so as to be independently deployed when the difference between angles of both seat backs is in a range which is equal to or more than a reference angle range, the side center airbag SCAB may be deployed by other collision signals and impact conditions.

Figure 4:
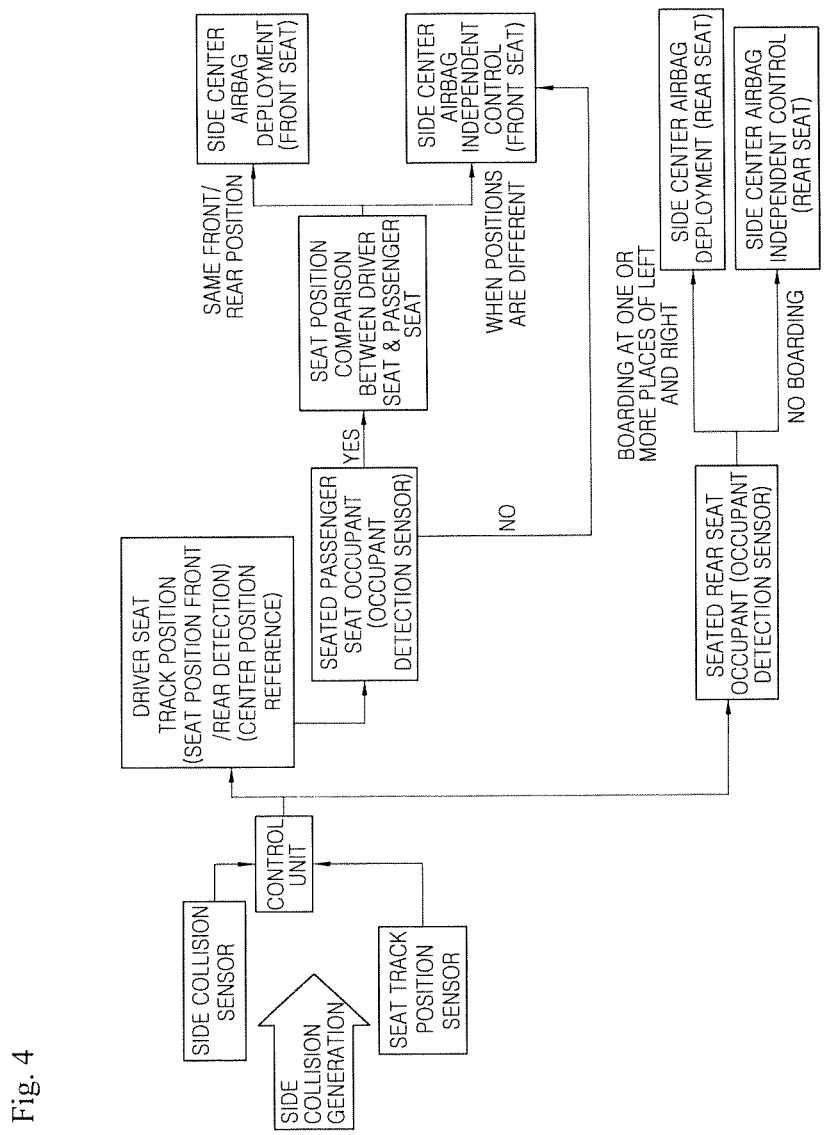
FIG. 4 is a diagram for explaining an occupant protection control flow according to a seat position in the event of the side collision under the system for protecting occupants in a vehicle according to the embodiment of the present invention.

Meanwhile, FIG. 4 is a diagram for explaining an occupant protection control flow according to a seat position in the event of the side collision under the system for protecting occupants in a vehicle according to the embodiment of the present invention. The controller 13 performs control so as to selectively deploy the front seat side center airbag SCAB and the rear seat side center airbag SCAB according to the seat position.

Specifically, when the controller 13 determines that the side collision of the vehicle occurs, the controller 13 may perform control so as to deploy the front seat side center airbag SCAB when occupants are seated on both front seats and both front seat positions are located in the same direction on the basis of the center point of the seat rail.

That is, when the side collision occurs in a state in which occupants are seated on the driver and passenger seats and the driver and passenger seats are identically located forward or rearward, the front seat side center airbag is deployed so as to prevent a risk of secondary injuries caused by a collision between the occupants seated on the driver and passenger seats due to impact force by the side collision.

However, since the front seat side center airbag SCAB may be controlled so as to be independently deployed when both seat positions are located in different directions, the front seat side center airbag SCAB may be deployed by other collision signals and impact conditions.

In addition, when the controller 13 determines that the side collision of the vehicle occurs, the controller 13 may perform control so as to deploy the rear seat side center airbag SCAB when the one or more of the rear seats are occupied.

In certain embodiments, when the side collision occurs in a state in which the occupant is seated on at least one of the rear seats, the rear seat side center airbag SCAB is deployed.

However, in certain embodiments, when not all seats are occupied, the side center airbag SCAB may be controlled so as to be independently deployed or so as not to be deployed.

Figure 5:
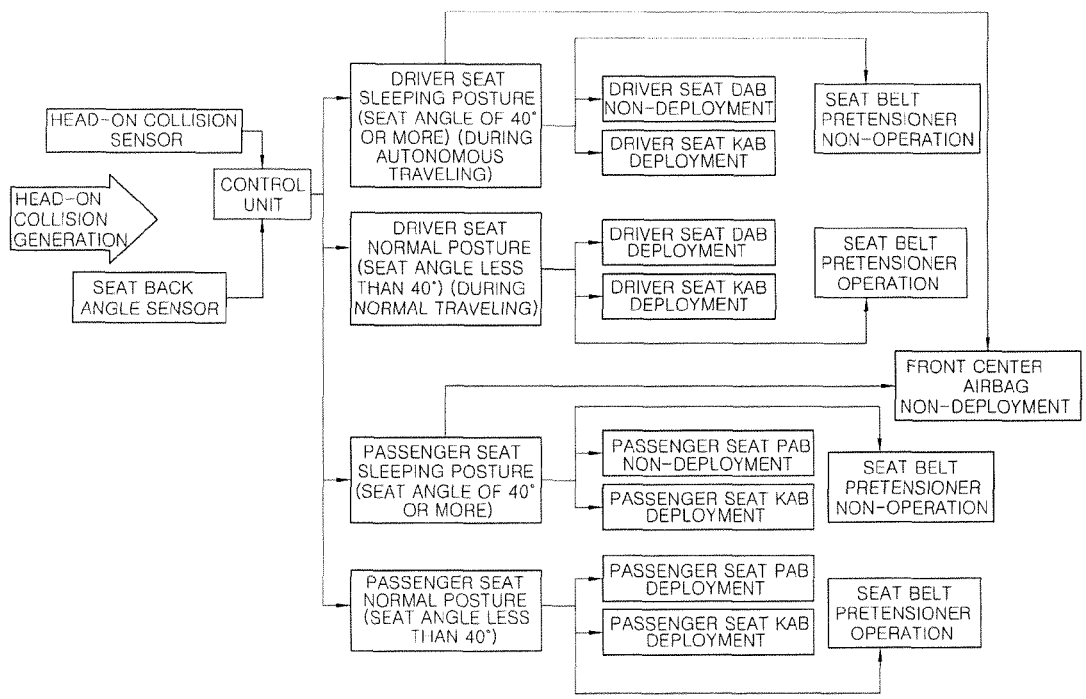
FIG. 5 is a diagram for explaining an occupant protection control flow according to a seat back angle in the event of a head-on collision under the system for protecting occupants in a vehicle according to the embodiment of the present invention.

Meanwhile, FIG. 5 is a diagram for explaining an occupant protection control flow according to a seat back angle in the event of a head-on collision under the system for protecting occupants in a vehicle according to the embodiment of the present invention. The controller 13 performs control such that a driver seat front airbag DAB and knee airbag DKAB, and a passenger seat front airbag PAB and knee airbag PKAB are selected and deployed according to the seat back angle.

Specifically, when the controller 13 determines that the head-on collision of the vehicle occurs, the controller 13 may perform control such that the knee airbag is deployed and the front airbag is not deployed when the seat back angle is equal to or more than a reference angle.

When seated on a seat whose back is tilted rearward above a certain angle, occupants may not be protected by front airbags or may have a risk of secondary injuries due to striking of the occupants by airbag cushions when the driver seat front airbag DAB and the passenger seat front airbag PAB are deployed. Therefore, in certain embodiments, when the occupants seated on the driver and passenger seats are reclined on seats tilted rearward more than a certain angle, the front airbags are not deployed and only the driver and passenger seat knee airbags DKAB and PKAB are deployed.

On the other hand, when the controller 13 determines that the head-on collision of the vehicle occurs, the controller 13 may perform control so as to deploy the knee airbags and the front airbags when the seat back angle is less than the reference angle.

That is, in order to actively protect the occupants seated on the driver and passenger seats in a general boarding posture in which the occupants are seated on the driver and passenger seats, the driver and passenger seat airbags are deployed together with deployment of the driver and passenger seat knee airbags DKAB and PKAB.

In this case, when the controller 13 determines that the head-on collision of the vehicle occurs, the controller 13 may perform control such that a seat belt pretensioner is operated when the seat back angle is less than the reference angle.

The controller 13 may perform control such that a front center airbag FCCA is not deployed when the seat back angle is equal to or more than the reference angle.

Figure 6:
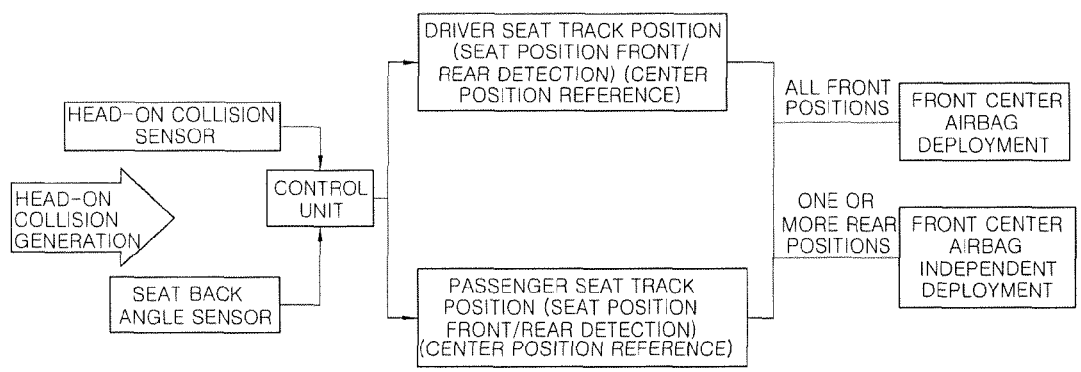
FIG. 6 is a diagram for explaining an occupant protection control flow according to a seat position in the event of the head-on collision under the system for protecting occupants in a vehicle according to the embodiment of the present invention.

Meanwhile, FIG. 6 is a diagram for explaining an occupant protection control flow according to a seat position in the event of the head-on collision under the system for protecting occupants in a vehicle according to an embodiment of the present invention. The controller 13 performs control so as to select and deploy the front center airbag FCCA according to the seat position.

Figure 11:
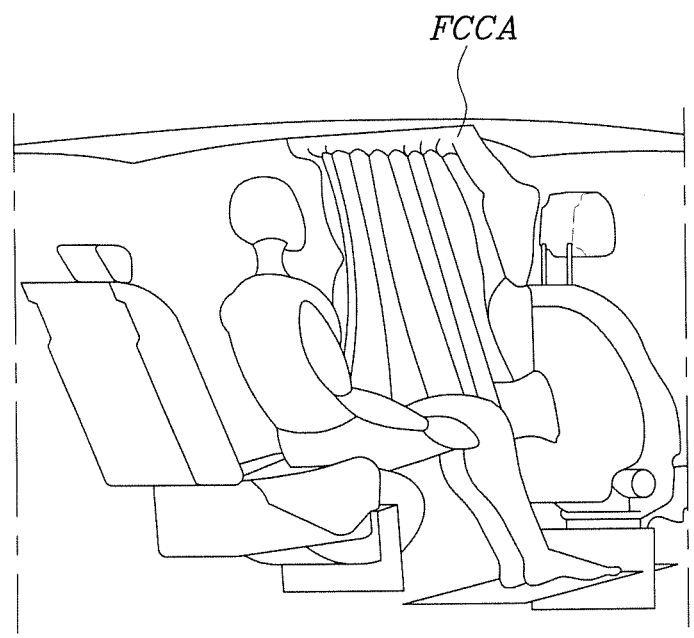
FIG. 11 is a view illustrating a front center airbag used in the system for protecting occupants in a vehicle according to the embodiment of the present invention.

Here, the front center airbag FCCA may be an airbag deployed so as to block a gap between the front seat and the rear seat as shown in FIG. 11.

Specifically, when the controller 13 determines that the head-on collision of the vehicle occurs, the controller 13 may perform control so as to deploy the front center airbag FCCA when both front seat positions are all located forward on the basis of the center point of the seat rail.

That is, since the front center airbag FCCA is deployed between the front seat and the rear seat, the front center airbag FCCA may be deployed without interference with the occupant when the front seat is moved forward, thereby enabling the front center airbag FCCA to be deployed.

However, when the front seat is moved rearward, the front center airbag FCCA may be deployed over the occupant seated on the front. Therefore, the front center airbag FCCA may be controlled so as to be independently deployed by other collision signals or impact conditions.

Figure 7:
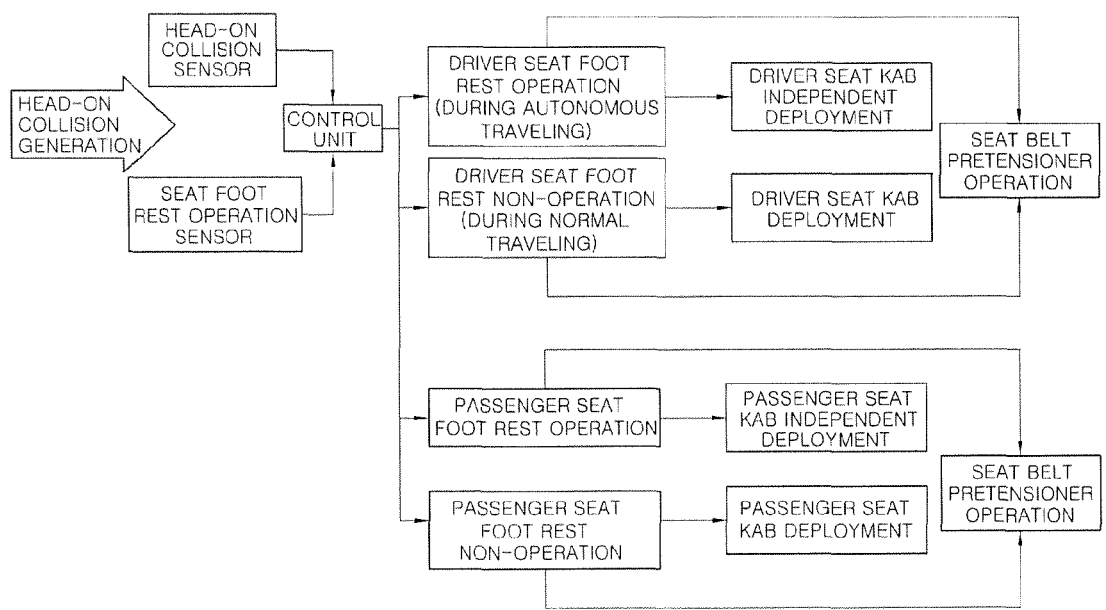
FIG. 7 is a diagram for explaining an occupant protection control flow according to whether or not a lower body support mechanism is operated in the event of the head-on collision under the system for protecting occupants in a vehicle according to the embodiment of the present invention.

Meanwhile, FIG. 7 is a diagram for explaining an occupant protection control flow according to whether or not a lower body support mechanism is operated in the event of the head-on collision under the system for protecting occupants in a vehicle according to the embodiment of the present invention. The controller 13 performs control so as to select and deploy the knee airbag according to whether or not the lower body support mechanism is operated.

To this end, embodiments of the present invention may further include an operation detection sensor 9 which detects whether or not the lower body support mechanism for supporting a lower body of an occupant is operated.

Here, the lower body support mechanism may be a known foot rest mechanism capable of supporting feet of the occupant or a known leg rest mechanism capable of supporting legs. In addition to this mechanism, various mechanisms capable of supporting the feet or legs of the occupant may be applied as the lower body support mechanism.

When the controller 13 determines that the head-on collision of the vehicle occurs, the controller 13 may perform control so as to deploy the knee airbag when the lower body support mechanism is not operated.

That is, when the head-on collision occurs in a state in which the lower body support mechanisms provided at the driver and passenger seats are not operated, the driver and passenger seat knee airbags DKAB and PKAB are deployed.

However, the driver and passenger seat knee airbags DKAB and PKAB may be controlled so as to be independently deployed when the lower body support mechanisms provided at the driver and passenger seats are operated. Therefore, the driver and passenger seat knee airbags DKAB and PKAB may be controlled so as to be deployed by other collision signals and impact conditions.

In addition, when the controller 13 determines that the head-on collision of the vehicle occurs, the controller 13 may perform control such that the seat belt pretensioner is operated regardless of the operation of the lower body support mechanism.

Figure 8:
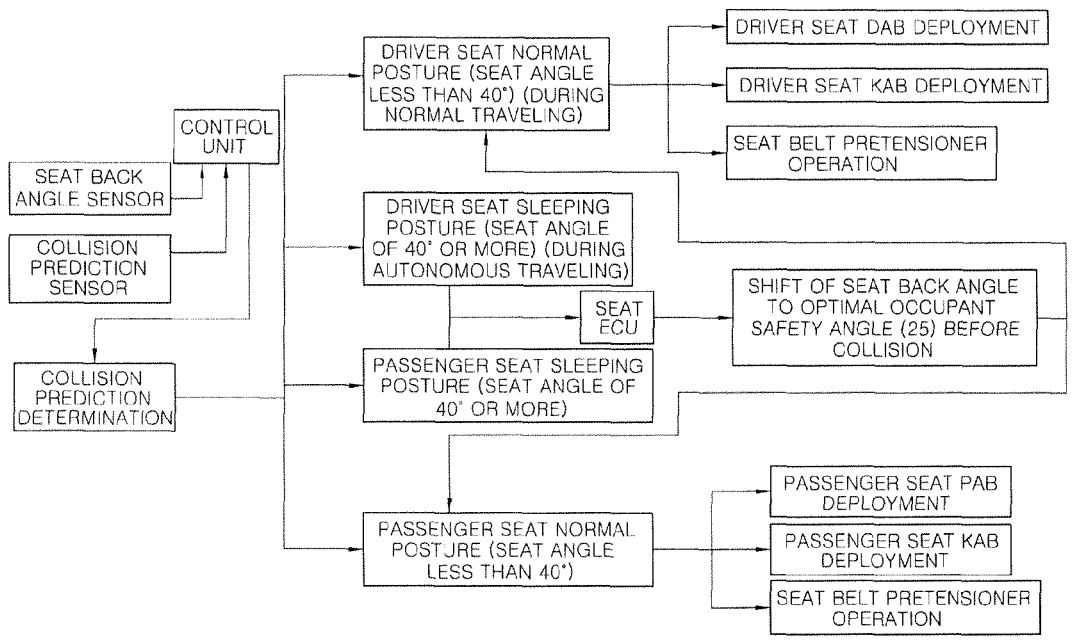
FIG. 8 is a diagram for explaining an occupant protection control flow according to a seat back angle when the head-on collision is predicted under the system for protecting occupants in a vehicle according to the embodiment of the present invention.

Meanwhile, FIG. 8 is a diagram for explaining an occupant protection control flow according to a seat back angle when the head-on collision is predicted under the system for protecting occupants in a vehicle according to an embodiment of the present invention. The controller 13 may perform control so as to deploy the front airbag and the knee airbag according to the seat back angle.

Specifically, when the collision prediction signal of the vehicle is input to the controller 13, the controller 13 may control an operation of the seat back such that the seat back angle is a safety reference angle when the seat back angle is equal to or more than the reference angle.

Here, the safety reference angle is a seat back angle at which occupant safety is optimized before the collision, and may be set through experimentation.

The safety reference angle may be an angle less than the reference angle. That is, when a vertical state of the seat back is assumed as 0°, in certain embodiments, the safety reference angle may be set as about 25° when the reference angle is set as about 40° at which the seat back is tilted rearward.

Through such a configuration, when the collision prediction is detected in a state in which the seat backs of the driver and passenger seats are reclined at an angle equal to or more than the reference angle, the seat backs are rotatably operated such that the seat back angle is the safety reference angle.

Subsequently, when the collision prediction signal of the vehicle is input to the controller 13, the controller 13 may perform control such that the front airbag and the knee airbag are deployed and the seat belt pretensioner is operated when the seat back angle is less than the reference angle.

That is, when the angles of the seat backs of the driver and passenger seats are less than the reference angle or the seat backs are rotatably operated at the safety reference angle by operation control of the seat back, the knee airbags are deployed together with the driver and passenger seat front airbags PAB and the seat belt pretensioner is operated. Consequently, the occupants are safely protected from impacts caused by the collision.

Meanwhile, a method for protecting occupants in a vehicle according to certain embodiments of the present invention may include a seat posture input step, a signal input step, and a control step.

Specifically, in the seat posture input step, data for an angle of a seat back or front and rear positions of a seat are input.

In the signal input step, a collision signal of a vehicle or a collision prediction signal is input.

In addition, when the collision signal of the vehicle is input, in the control step, a collision generation direction is determined, and airbags provided around occupants are controlled to be selectively deployed according to the collision generation direction and a seat posture.

As describe above, embodiments of the present invention determine the collision direction of the vehicle and the seat posture based on the signals input to the controller 13, select an airbag cushion capable of safely protecting the occupant from impacts among various airbag cushions, according to the conditions, and expand and deploy the selected airbag cushion. Accordingly, since optimal airbags are selectively deployed even though the collision accident occurs in a state in which the seat back is reclined or the seat is moved forward or rearward, the occupant boarding the vehicle may be safely protected from impacts of the collision accident.

As is apparent from the above description, embodiments of the present invention determine a collision direction of a vehicle and a seat posture, select an airbag cushion capable of safely protecting an occupant from impacts among various airbag cushions, based on the conditions, and expand and deploy the selected airbag cushion. Accordingly, since optimal airbags are selectively deployed even though a collision accident occurs in a state in which a seat back is reclined or a seat is moved forward or rearward, the occupant boarding the vehicle may be safely protected from impacts of the collision accident.

While the embodiments of the present invention have been described with respect to the specific embodiments, it will be apparent to those skilled in the art that various changes and modifications may be made without departing from the spirit and scope of the invention as defined in the following claims.

What is claimed is:

1. A system for protecting one or more occupants in a vehicle, comprising:
   a seat posture sensor configured to detect seat posture data;
   a collision detector configured to detect collision data of the vehicle;
   a controller configured to receive the collision data from the collision detector, determine a collision generation direction, and selectively deploy one or more airbags provided around the one or more occupants according to the collision generation direction and the seat posture data detected by the seat posture sensor, and
   an occupant detection sensor configured to detect whether or not two or more seats are occupied,
   wherein the controller is configured to selectively deploy, upon determining that a side collision of the vehicle occurs, a side center airbag according to the seat posture data and whether or not two or more seats are occupied, and
   wherein the controller is configured to deploy, upon determining that the side collision occurs, the side center airbag when two or more seats are occupied and a difference between angles of two seat backs of the two or more occupied seats is within a reference angle range.

2. The system of claim 1, wherein the seat posture data includes a seat back angle or data regarding front and rear positions of a seat.

3. The system of claim 2, wherein the collision data includes a collision signal or a collision prediction signal.

4. The system of claim 3, wherein the controller is configured to control, upon receiving the collision prediction signal, the seat back to be at a set safety angle when the seat back angle is equal to or more than a reference angle.

5. The system of claim 4, wherein the controller is configured to, upon receiving the collision prediction signal, deploy a front airbag and a knee airbag and operate a seat belt pretensioner when the seat back angle is less than the reference angle.

6. The system of claim 2, wherein the controller is further configured to, upon determining that a side collision occurs, deploy a side airbag provided at a side door when the seat back angle is equal to or more than a reference angle and deploy the side airbag and a curtain airbag provided at the side door when the seat back angle is less than the reference angle.

7. The system of claim 6, wherein the controller is configured to deploy, upon determining that the side collision occurs, at least one of the side airbag and the curtain airbag at a collision generation side.

8. The system of claim 2, wherein the controller is configured to, upon determining that a head-on collision of the vehicle occurs, deploy a knee airbag and not deploy a front airbag when the seat back angle is equal to or more than a reference angle.

9. The system of claim 2, wherein the controller is configured to deploy, upon determining that a head-on collision of the vehicle occurs, a knee airbag and a front airbag when the seat back angle is less than a reference angle.

10. The system of claim 9, wherein the controller is configured to operate, upon determining that the head-on collision of the vehicle occurs, a seat belt pretensioner when the seat back angle is less than the reference angle.

11. The system of claim 1, wherein the controller is configured to deploy, upon determining that the side collision occurs, a front seat side center airbag when two front seats are occupied and positions of both front seats are in the same direction from a center point of a seat rail.

12. The system of claim 1, wherein the controller is configured to deploy, during the side collision of the vehicle, a rear seat side center airbag when at least one rear seat is occupied.

13. The system of claim 1, wherein the controller is configured to deploy, upon determining that a head-on collision of the vehicle occurs, a front center airbag when two front seats are in a forward position based on a center point of a seat rail.

14. The system of claim 1, further comprising an operation detection sensor configured to detect whether or not a lower body support mechanism for supporting a lower body of one of the occupants is operated,
wherein the controller is configured to deploy, upon determining that a head-on collision of the vehicle occurs, a knee airbag when the lower body support mechanism is not operated.

15. The system of claim 14, the controller is configured to operate, upon determining that the head-on collision of the vehicle occurs, a seat belt pretensioner regardless of whether the lower body support mechanism is operated.

16. The system of claim 14, wherein the lower body support mechanism is a foot rest.

* * * * *